US007587448B2

(12) United States Patent
Usami

(10) Patent No.: US 7,587,448 B2
(45) Date of Patent: Sep. 8, 2009

(54) ON-LINE PHOTO PROCESSING AND PRINTING SYSTEM

(75) Inventor: Yasushi Usami, Wakayama (JP)

(73) Assignee: Noritsu Koki Co., Ltd., Wakayama-shi, Wakayama-ken (JP)

( * ) Notice: Subject to any disclaimer, the term of this patent is extended or adjusted under 35 U.S.C. 154(b) by 450 days.

(21) Appl. No.: 10/305,847

(22) Filed: Nov. 26, 2002

(65) Prior Publication Data

US 2003/0101218 A1 May 29, 2003

(30) Foreign Application Priority Data

Nov. 29, 2001 (JP) ............................. 2001-364863

(51) Int. Cl.
*G06F 15/16* (2006.01)
(52) U.S. Cl. ...................... 709/203; 709/201; 358/1.9; 358/426.12
(58) Field of Classification Search ................. 709/201, 709/203; 358/1.9, 426.12
See application file for complete search history.

(56) References Cited

U.S. PATENT DOCUMENTS

| 6,097,389 | A | * | 8/2000 | Morris et al. ................ 715/804 |
| 6,122,069 | A | * | 9/2000 | Kendall et al. ................ 358/1.9 |
| 6,185,000 | B1 | | 2/2001 | Shiota et al. |
| 6,519,046 | B1 | * | 2/2003 | Kinjo .......................... 358/1.1 |
| 6,571,271 | B1 | * | 5/2003 | Savitzky et al. ............. 709/200 |
| 6,573,927 | B2 | * | 6/2003 | Parulski et al. ................ 348/32 |
| 6,657,702 | B1 | * | 12/2003 | Chui et al. ..................... 355/40 |
| 7,146,398 | B2 | * | 12/2006 | Kuroiwa et al. ............. 709/203 |
| 2002/0012134 | A1 | * | 1/2002 | Calaway ..................... 358/1.18 |
| 2002/0059322 | A1 | * | 5/2002 | Miyazaki et al. ............. 707/200 |
| 2002/0101539 | A1 | * | 8/2002 | Yokota ........................ 348/552 |
| 2003/0039469 | A1 | * | 2/2003 | Kim ............................. 386/69 |
| 2003/0093493 | A1 | * | 5/2003 | Watanabe et al. ........... 709/217 |
| 2003/0097410 | A1 | * | 5/2003 | Atkins et al. ................ 709/206 |
| 2005/0001851 | A1 | * | 1/2005 | Okisu et al. ................. 345/619 |
| 2005/0264832 | A1 | * | 12/2005 | Baum et al. .................. 358/1.2 |
| 2007/0053004 | A1 | * | 3/2007 | Calaway .................... 358/3.28 |

FOREIGN PATENT DOCUMENTS

EP 0 856 972 A2 8/1998

(Continued)

OTHER PUBLICATIONS

T. Amiya, "Internet 120% Katsuyou Kouza: Internet de Photo Album wo Tsukurou (The Course for 120% Utilization of Internet: Let's make the Photograph Album upon the Internet)", *Mac People Beginners*, Kabshiki-kaisha Ascii, vol. 5, Apr. 1, 2001, pp. 136-139.

Primary Examiner—Nathan J Flynn
Assistant Examiner—Mohamed Wasel
(74) Attorney, Agent, or Firm—Knobbe Martens Olson & Bear LLP

(57) ABSTRACT

A print system including a server system to provide an on-line album via network to a client and a photo processing system capable of downloading a picture pasted in the on-line album to make a photo print, wherein title information of the picture together with the picture can be provided from the client side to the on-line album and can also be downloaded by the photo processing system, thereby making a photo print on which the picture and the title information are both formed.

17 Claims, 7 Drawing Sheets

FOREIGN PATENT DOCUMENTS

| | | |
|---|---|---|
| EP | 0 930 774 A2 | 7/1999 |
| JP | 8-050336 | 2/1996 |
| JP | 9-211835 | 8/1997 |
| JP | 10-191921 | 7/1998 |
| JP | 11-167594 | 6/1999 |
| JP | 2000-66312 | 3/2000 |
| JP | 2001-265547 | 9/2001 |
| JP | 2001-297157 | 10/2001 |
| KR | 2001016148 | 3/2001 |
| WO | WO 01/37260 A1 | 5/2001 |

* cited by examiner album: listing image of pictures with titles when a print order is placed index: a case where album name and picture titles are outputted

ON-LINE PHOTO PROCESSING AND PRINTING SYSTEM

BACKGROUND OF THE INVENTION

1. Field of the Invention

The present invention relates to an on-line album picture print system equipped with: a server system providing an on-line album via a network to a client; and a photo processing system capable of downloading picture data pasted in the on-line album to make a photo print, and to a server system and a photo processing system used in the on-line album picture print system.

2. Description of the Related Art

In company with the wide spread use of the internet, an on-line photo print ordering system has increasingly become of a common knowledge. A client to place an order for a print on-line accesses with a personal computer to a home page (Web site) of a photo shop or the like posted on a Web to upload picture data to a Web site (server) through the personal computer. On the other hand, the photo shop uses a photo processing system installed thereat to access the Web site in a similar manner to download the uploaded picture data to the photo processing system. A photo print is made using the down loaded picture data.

Furthermore, when such a web site is provided, an on-line album is also provided in connection to a service rendered to the client. The on-line album is of the same as an actual album in function and provided on a web. A client to utilize an on-line album uploads picture data using a personal computer to thereby enable the picture to be pasted in the on-line album (see FIG. 4). Moreover, a title (auxiliary data) can also inputted together with pasting of the picture. In the example of FIG. 4, titles such as "now, let' start" and others are inputted together with pasting of pictures. By doing so, the album can be of more fun. Such an on-line album can be accessed by other persons with ease than a person who has formed the album if there is available an environment to access to the internet with a personal computer.

In a case where making of a photo print of pictures even pasted in the on-line album is requested, an order for the print can be placed on-line. Picture data relating to a print order is transferred from a server system to a photo processing system to make a photo print in the photo processing system.

In the above prior art system, however, only a picture that is pasted in an on-line album is made as a print for which an order is placed through an on-line album, whereas a title (auxiliary information) inputted in company with the picture is not made as a print. Therefore, if information attached to a picture as auxiliary is to be viewed, a necessity inconveniently arises for making an access to the on-line album only for the purpose.

Moreover, by connecting a printer to a personal computer, a picture displayed on a personal computer screen as shown in FIG. 4 can be printed. When a screen imaged is played by a browser is printed, unnecessary parts other than a photo picture and its title are printed in addition to the picture and its title. In an example display of FIG. 4, printed are as far as click buttons such as "proceeding page" and "subsequent page." What'worse, an ink-j et printer generally used in a home is problematic in aspects of not only its slow speed but also low resolution.

SUMMARY OF THE INVENTION

The present invention has been made in light of the above actual circumstances, and it is an object of the present invention to provide an on-line album picture print system capable of making a print of a picture and auxiliary information thereof included in an on-line album.

A print system for an on-line album picture relating to the present invention, in order to solve the above problems, includes:

a server system providing an on-line album to a client through a network; and a photo processing system capable of downloading picture data pasted in the on-line album to make a photo print, wherein auxiliary data of the picture data together with the picture data can be provided from the client side to the on-line album and the auxiliary data together with the picture data is also downloaded when the picture data is downloaded by the photo processing system, thereby enabling making a photo print on which the picture and the auxiliary information are both formed.

Description will be given of an action and effect of the print system are as follows.

The server system provides a client with an on-line album through a network such as the internet. The client can access to the on-line album to paste a picture (upload). Moreover, auxiliary data of the picture together with the picture can be inputted to the on-line album. On the other hand, when a print order for a picture in the on-line album arises, the photo processing system can download auxiliary data of a picture data together with the picture data. The photo processing system can make a photo print using the picture data and the auxiliary data. In such a way, a problem of the present invention can be solved.

Note that for convenience in the following description, images visually recognized on a print surface, a screen of a personal computer and others are referred to as a picture and auxiliary information thereof, while electronic data thereof residing in a memory, on a communication path and others are referred to as picture data and auxiliary data.

Auxiliary data is preferably inputted through a display image of an on-line album. Suitable auxiliary data can be inputted to each picture while viewing the album images.

An auxiliary data is preferably comment data on a picture. A comment can be, for example, data including factors associated with a personal view point such as an evaluation, an opinion, an impression and others of a picture.

A server system used in an on-line album picture print system relating to the present invention includes:

album providing means providing an on-line album through a network to a client;

information processing means processing picture data and auxiliary data thereof uploaded from the client to enable both processed data to be provided through the on-line album, wherein reception of an order for a print of a picture pasted in the on-line album is enabled through the album providing means, and the information processing means processes the picture data and the auxiliary data thereof relating to the print order so as to be transmittable to a photo processing system based on a download request from the photo processing system.

A server system with such a construction is equipped with album providing means and information processing means. The album providing means provides an on-line album to a client. The client can use the album providing means to paste a picture and also input auxiliary data thereof. When picture data and auxiliary data thereof are transmitted to a server system from a client, information processing means processes the data so as to enable the on-line album to be provided through album providing means.

Furthermore, there can be performed on-line reception of an order for a print of a picture pasted in an on-line album through the album providing means. When a download request is made for information relating to the print order to the server system from the photo processing system, the information processing means transmits both of picture data and auxiliary data thereof to the photo processing system. The photo processing system can make a photo print using the picture data and the auxiliary data thereof. In such a way, a problem to be solved in the present invention can be solved.

In a preferable embodiment of the present invention, the auxiliary data is title information of a picture. Accordingly, contents of the title enables a situation in which a picture is taken and contents of the picture to be known. A highly value-added photo print can be provided by forming a picture and a title combined on a photo print.

As another preferable embodiment of the present invention, the album providing means is constructed so as to provide a bulletin board on which a comment on a picture can be written to process the comment written on the bulletin board as the auxiliary data.

The bulletin board (BBS: electronic bulletin board system) is a system in which comments and opinions of many persons can be written on a network. The bulletin board system provides functions of the board that not only can a picture be pasted by album providing means but comments on a picture can also be written. Information written through the bulletin board is handled as auxiliary data to form an auxiliary information in coexistence with a picture on a photo print. Thereby, a highly value-added photo print can be provided.

As still another preferable embodiment of the present invention, the information processing means produces index picture data based on picture data and auxiliary data of the picture.

The index picture data is used for making an index print. The index print is an arrangement in a prescribed format of thumb nails pictures obtained by contraction of pictures. The index picture data produced by the information processing means enables printing of auxiliary information together with a picture. Therefore, there can be provided an index print with a higher added-value as compared with a prior art index print. Furthermore, since index picture data is produced by information processing means of a server system, there occurs an advantage that in the photo processing system, the index picture data is not necessary to be produced and in turn, no necessity arises for changing a software or the like for producing an index picture.

A photo processing system used in an on-line album picture print system relating to the present invention includes:

communication means downloading a picture pasted in an on-line album provided by a server system, wherein auxiliary data of a picture together with the picture data can be provided from the client side to the on-line album and when a picture is downloaded therefrom by the communication means, the auxiliary data is downloaded together with the picture, and further includes: a print making means making a photo print on which the picture and the auxiliary information are both formed, based on the picture data and the auxiliary data downloaded.

With such a photo processing system adopted, a photo print can be made using a picture and auxiliary information thereof downloaded from a server system. Thereby, a problem to be solved in the present invention can be solved.

Furthermore, as a preferable embodiment of a photo processing system relating to the present invention, the print making means forms a picture on a front surface of a photosensitive material and auxiliary information on a rear surface thereof.

A photo processing system is equipped with a printing mechanism printing a frame number, correction data for color and a density on a rear surface of a print. With the printing mechanism adopted, the auxiliary information can be formed on the rear surface. Therefore, no necessity arises for installing a specific mechanism for forming the auxiliary information, thus realizing a costwise advantage.

DETAILED DESCRIPTION OF THE PREFERRED EMBODIMENTS

Description will be given of a preferred embodiment of an on-line album picture print system relating to the present invention using an accompanying drawing.

<Simple Construction of System>

Figure 1:
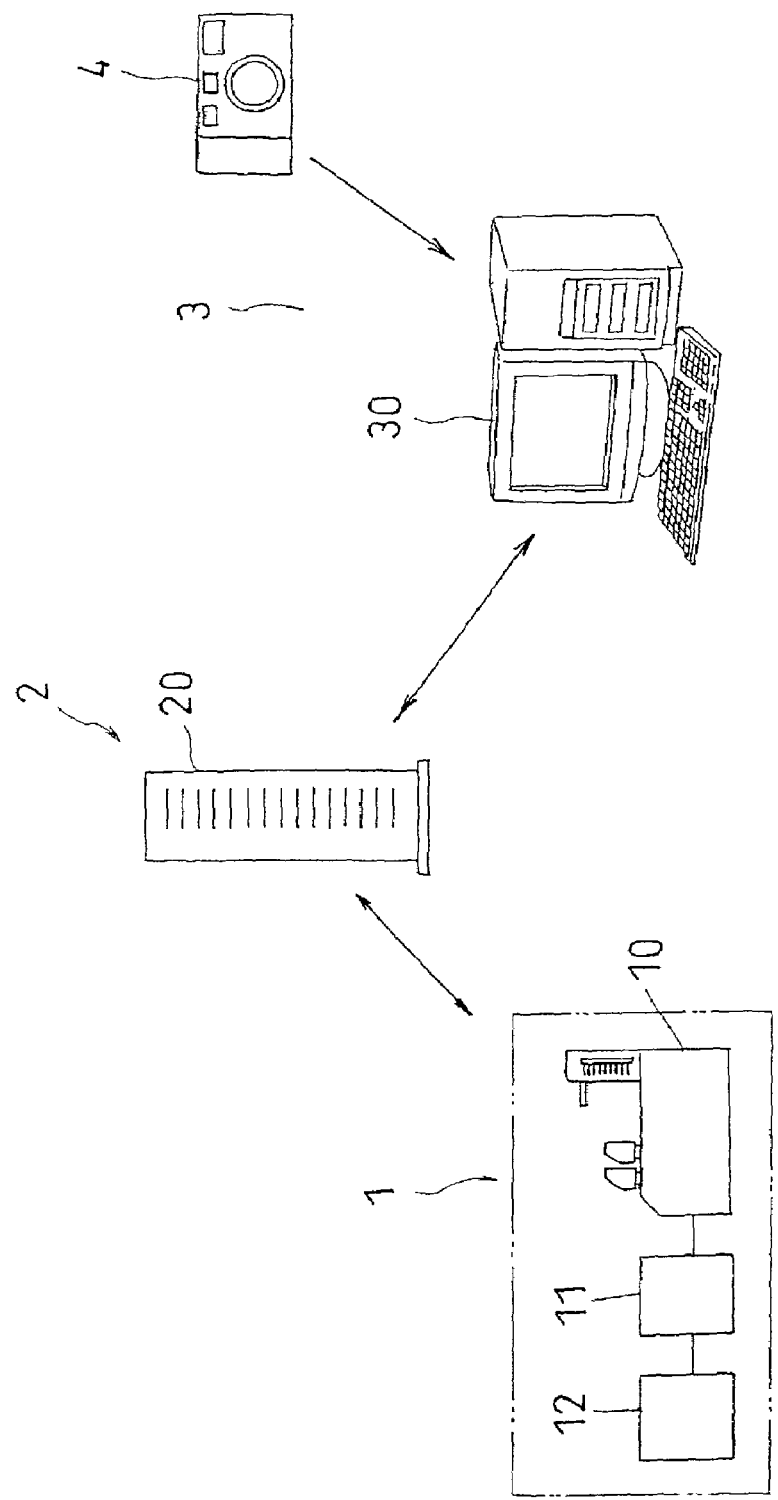
FIG. 1 is a model representation showing a simple construction of an on-line album picture print system.

In FIG. 1, a photo processing system 1 includes: a printer processor 10: an image processor 11; and a communication device 12. The printer processor 10 is equipped with a digital exposure engine to perform exposure and printing a picture on a photosensitive material such as a paper based on picture data to make a photo print. The image processor 11 reads a frame image on a developed negative film into digital data and captures picture data from a record medium such as floppy disk, MO disk and others. Moreover, picture data can be obtained from the communication device 12.

The communication device 12 includes a personal computer and can perform communications with the server system 2 through a communication network such as the internet. The communication device 12 can download picture data and auxiliary data thereof from the server system 2 and the downloaded picture data and auxiliary data are transferred to the image processor 11. Connected by communication cables are the printer processor 10, the image processor 11 and the communication device 12.

The server system 2 is equipped with at least one server device 20. The server device 20 is installed in a network of the internet, providing an imaginary shop (an imaginary photo shop) for receiving an on-line print order. Note that membership registration is necessary to receive a service of an on-line print order. Moreover, an on-line album is also provided in connection with a service of an on-line print order.

The server system 2 stores picture data uploaded from a client system 3 on a hard disk. Uploading of a picture from a client is divided in two ways into a case where a picture is pasted in an on-line album and a case of an ordinary on-line print order. In the cases, picture data is stored in respective prescribed directories. Then, picture data is transferred according to a picture data download request from the photo processing system 1. The downloading is divided in two ways into a case of picture data pasted in an on-line album and a case of picture data of an ordinary on-line print order. Note that description will be given of a case of a picture in an on-line album in this embodiment.

The client system 3 is constructed of the personal computer 30 and peripheral equipment thereof, and a browser for connection to the internet. With registration to a membership filed, it becomes possible that an access can be made to an imaginary shop from a personal computer 30 to place an order for a print with the shop. When a print order is placed, picture data is uploaded to the server system 2. Furthermore, when a picture is pasted into an on-line album as well, picture data is uploaded to the server system 2. The personal computer 30 can capture a picture photographed by a digital camera 4 according to a known procedure.

<Functional Block Diagram of System>

Figure 2:
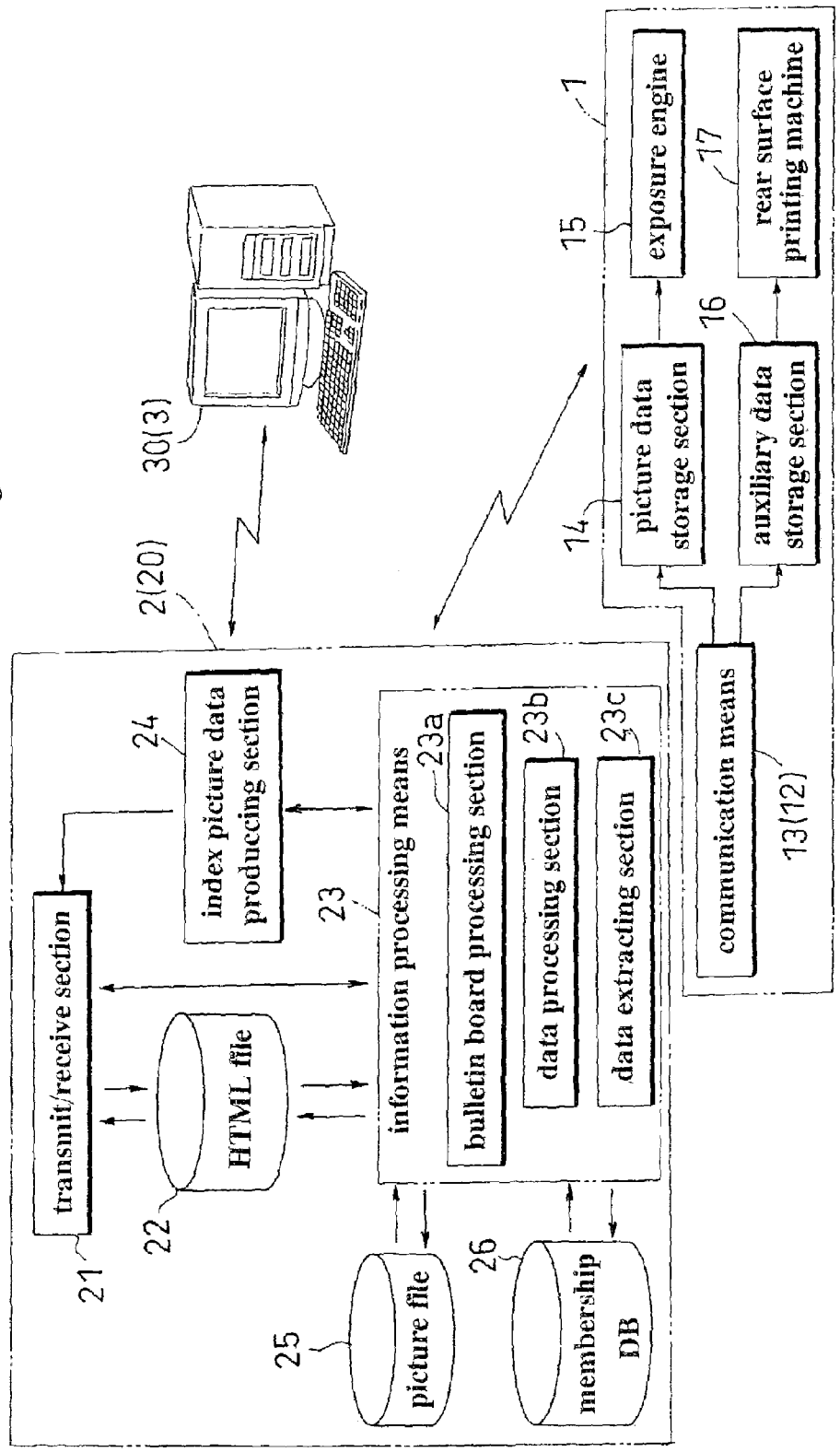
FIG. 2 is a block diagram describing functions of the system of FIG. 1.

Then, description will be given of functions of the system with reference to a block diagram of FIG. 2. The photo processing system 1 includes: the communication device 13 performing communications with the server system 2 through a network of the internet. A function of the communication means 13 can be realized by a communication program installed in the communication device 12 (personal computer) and an interface for communication. A picture data storage section 14 stores picture data and index picture data downloaded from the server system 2 through the communication device 13. An Auxiliary data storage section 16 stores likewise auxiliary data downloaded from the server system 2. Note that the storage sections 14 and 16 include hard ware such as hard disks and memories.

The exposure engine 15 performs exposure and printing of a picture on a photosensitive material such as paper based on picture data. The exposure engine 15 can be of a proper type among a laser engine, a PLZT engine, a CRT engine and others. The exposure engine 15 works as print making means. A photosensitive material on which a picture is exposed and printed is subjected to known developing and drying treatments, thereby enabling making a photo print.

The rear surface printing machine 17 prints auxiliary information (auxiliary data) on the rear surface of the photosensitive material. The rear surface printing machine 17 can be of a proper type among a dot impact type, an ink ribbon type and others. Not that, the rear surface printing machine 17 is provided for printing a frame number, correction data for color and a density on a rear surface of a print and is also used for printing of auxiliary information.

Then, description will be given of a construction of the server system 2 (server device 20). A transmit/receive section 21 performs transmission/reception of various data with the photo processing system 1 and the client system 3 through a network of the internet. The transmit/receive section 21 can be constituted of a communication program installed in the server device 20; a communication interface and others.

Multiple HTML files are held in an HTML file holding section 22. For example, there are held Web pages (corresponds to album providing means) for providing an on-line album to a client with a registered membership and Web pages for a client and a photo shop to register a membership and others.

Information processing means 23 performs various data processing based on commands from the client system 3 and the photo processing system 1. The information processing means 23 can be realized by, for example, CGI program. The information processing means 23 can convert a result of the processing into a HTML file to send the file back to the photo processing system 1 and the client system 3. A bulletin board processing section 23a can cause an on-line album to work as a bulletin board and can process a comment written into the bulletin board to transmit the processed comment to a client as an HTML file.

For example, when writing-in or correction of a title (auxiliary data) is performed to an on-line album or when pasting of a new picture or deleting a pasted picture is performed, a data processing section 23b performs processing of the picture data and the auxiliary data to provide a new (updated) on-line album.

A data extracting section 23c extracts picture data pasted in an on-line album and the auxiliary data to transmit the data to the photo processing system 1 through the transmit/receive section 21. The data is used for making a photo print. Furthermore, the extracted picture data and the auxiliary data are used to produce index picture data in an index picture data producing section 24. The index pictured at a is also transmitted to the photo processing system 1 and used for making an index print. The index picture data producing section 24 is constituted of a program for producing index picture data, templates for accommodating picture data and auxiliary data and others.

A picture holding section 25 holds picture data to be pasted in an on-line album in a prescribed format. Information on users and shops with registered memberships are registered in a membership data base 26. The information processing means 23 works to perform authentication by referring to the membership data base 26.

<On-Line Album>

Figure 3:
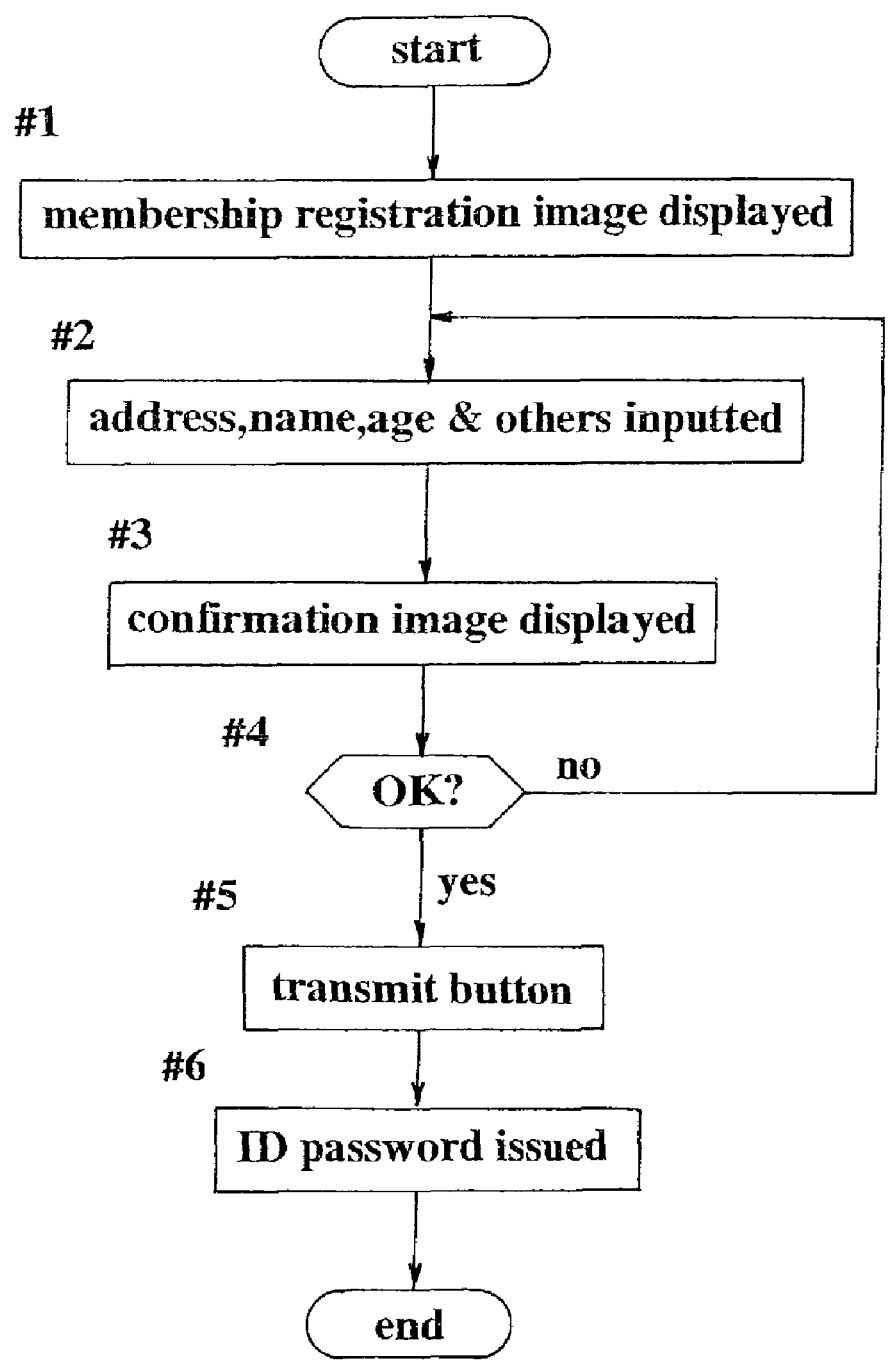
FIG. 3 is a flow chart showing a procedure for a membership registration.

An on-line album is an album provided by the server system 2 and residing on a net work. Registration of a membership is required to use the on-line album. Simple description will be given of a procedure for the registration using the flow chart of FIG. 3.

At first, a client makes an access to the server system 2 to view a Web page (home page) in order to use an on-line album. Furthermore, the client causes a membership registration image (not shown) linking to the Web page to be displayed on a monitor screen of the personal computer 30 (#1). The client inputs prescribed items while viewing the displayed screen image (#2). As the items, there can be named: an address, a name, an age, a sex, a home phone number, an occupation, a personal computer mail address and others.

When the inputting is over, a confirmation button on the screen is clicked on with a mouse. Thereby, a confirmation image is displayed on the screen of the personal computer 30 (#3). The client reviews the confirmation screen image to confirm whether or not there is error of the inputted items (#4). If no, the process returns to step #2 to repeat the inputting.

If yes, a transmit button is clicked on (#5). Thereby, fixed information is sent to the server system 2 to register the input data as membership data to a membership data base 26. Furthermore, ID and a password are issued by the server system 2 (#6). The ID and password are transmitted to the personal computer mail address of the client. With the above procedure performed, a necessary process for registration of a membership is completed.

By completing a membership registration as described above, an on-line album can be used. An example display of an on-line album is shown on a panel at the upper side of FIG. 4. Description will be given of a procedure in which a picture is pasted, using a flow chart of FIG. 5. In order to paste a picture, it is necessary to present an image display (not shown) for inputting a picture (#10). A user causes a picture input image to be displayed on the screen to designate a picture file to be pasted on the album (#11). Moreover, when a title (corresponding to auxiliary data) is to be attached to the picture, the title is inputted (#12). The title consists of text data in an ordinary case. When the inputting is over, the transmit button displayed on the screen is clicked on (#13).

Transmitted data is received by the server system 2 via a network of the internet (#14). Received picture data and auxiliary data are processed based on a function of the information processing means 23 (#15). As a result of the processing, an HTML file is newly produced and transmitted back to the personal computer of the client (#16, #17). Thereby, on the side of the client, there can be viewed an on-line album whose contents have been updated.

While the number of pictures displayed at a time on the screen image of an on-line album is limited, a picture on other pages can be viewed by clicking on the button of "preceding page" or "subsequent page." Pictures displayed as an album are thumb nail images obtained by contracting picture data. A picture before the contraction can be displayed by clicking on an individual thumb nail picture. Furthermore, titles are displayed below the corresponding thumb nails like "now, let'start", "with a high motivation", . . . . Note that an on-line album is not limited to the example construction shown in the figure, but various example modifications can be possible.

Figure 6:
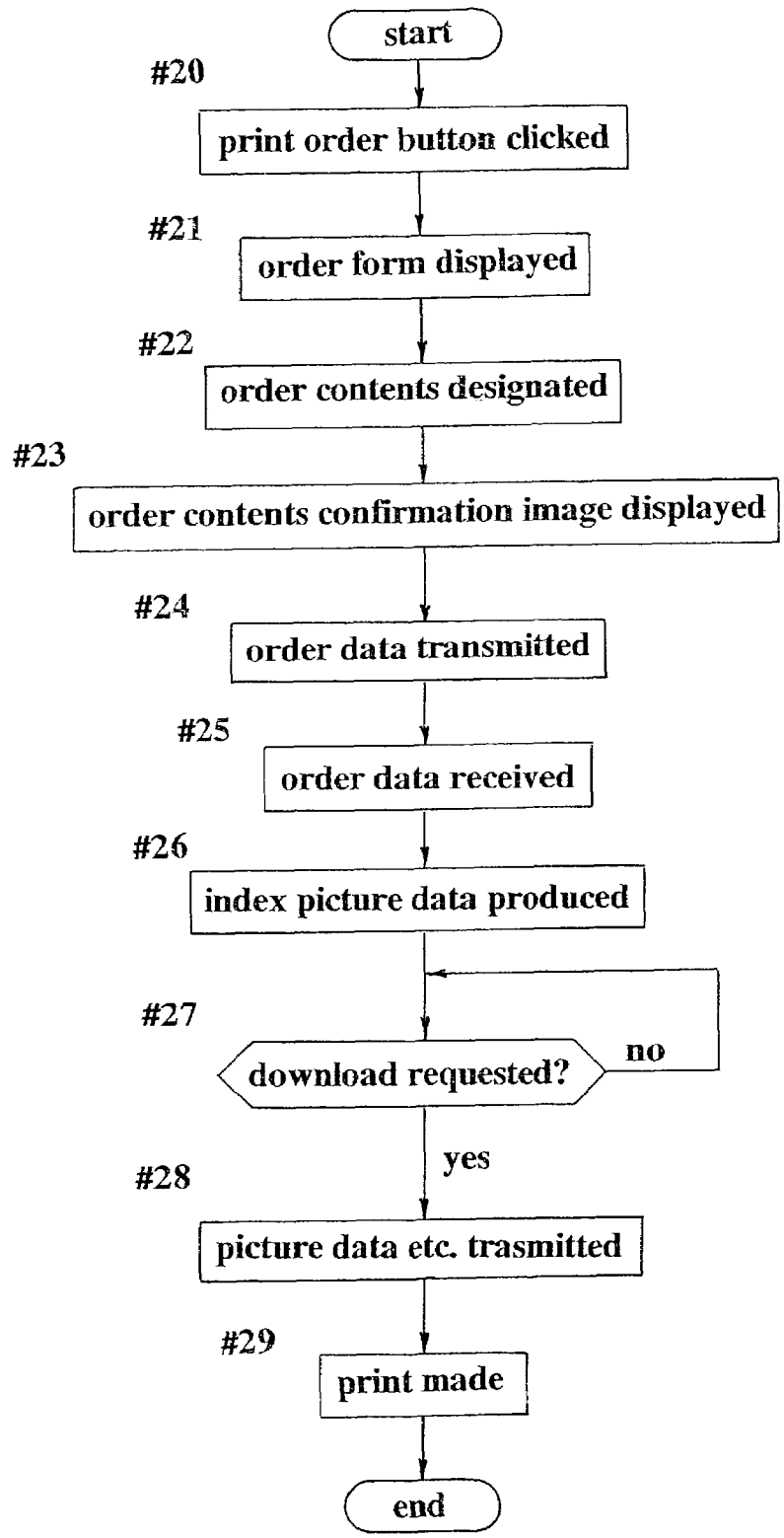
FIG. 6 is a flow chart showing a procedure in a case where an on-line print order is placed.

Then, description will be given of a procedure in a case where a print order is placed on-line using the flow chart of FIG. 6.

Figure 4:
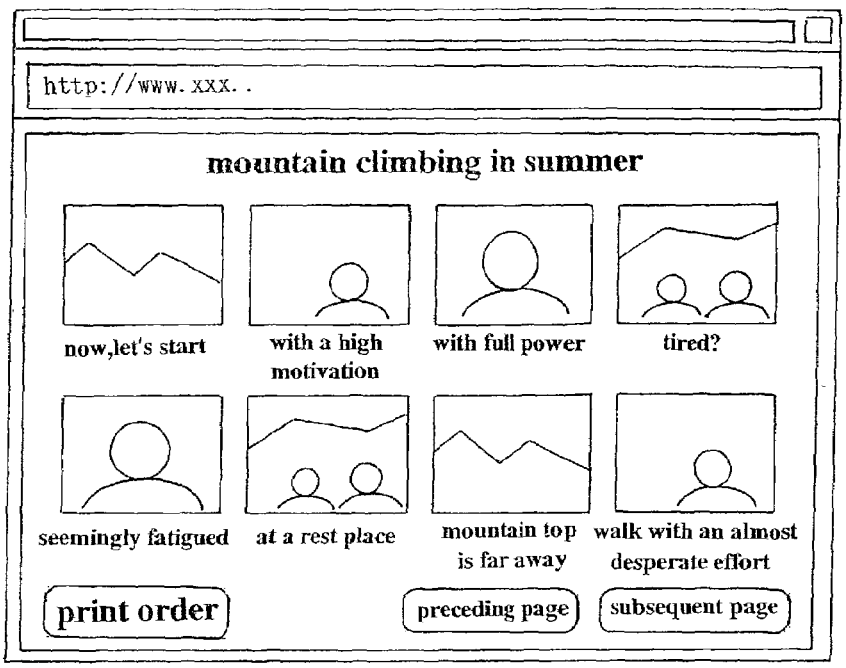
FIG. 4 is a representation showing an example display of an on-line album.
Figure 4:
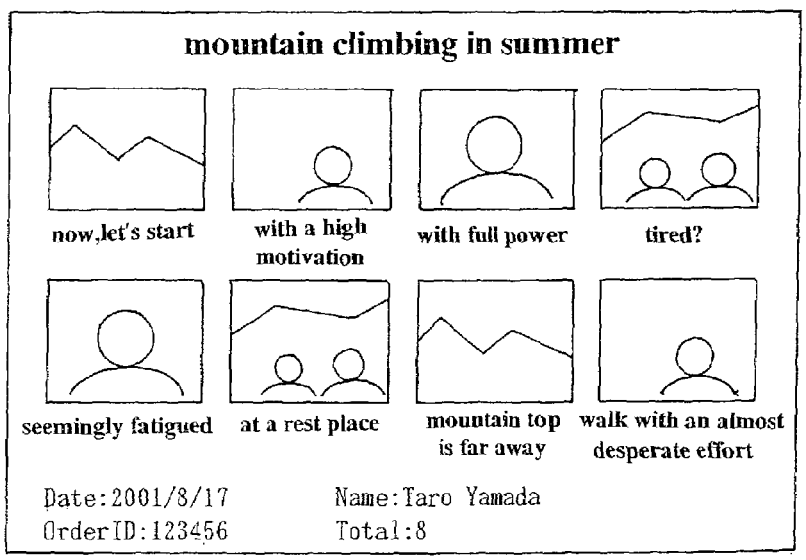
Figure 5:
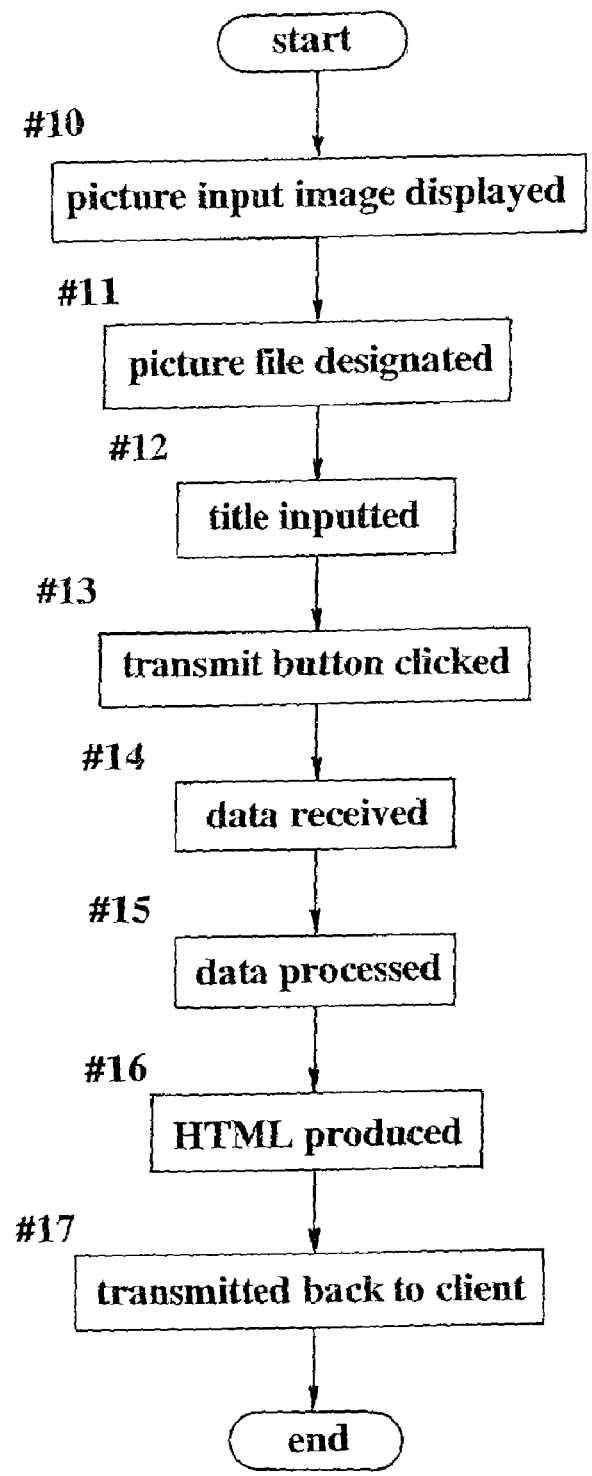
FIG. 5 is a flow-chart showing a procedure pasting a picture in an on-line album.

At first, a print order button is clicked on as shown on the example display image of FIG. 4 (#20). Thereby, an order form image (not shown) is displayed (#21). A user designates the contents of an order while viewing the screen image (#22). For example, it is to designate which of the pictures should be made as a photo print. Moreover, a designation can also be performed on which of the index pictures should be made as an index print. A designation can also be performed on whether a title should be printed. In this case, there are two ways available; one is to print titles together with thumb nail pictures on an index print, and the other is to print titles individually on respective corresponding prints. A case where titles are formed on corresponding individual prints, the titles are each printed on the rear surface of the print. It is of course possible to designate titles are formed on both of respective individual photo prints and collectively an index print. Furthermore, it is designated at which of photo shops a photo print is requested.

After designation of the contents of an order is over, a confirmation image of the contents of the order is displayed (#23). It is confirmed on the confirmation image whether or not there is an input mistake or the like in the contents of the order. If yes, the transmit button displayed on the screen is clicked on to transmit the order data to the server system 2 (#24).

The transmitted data is received by the server system 2 (#25). Received data is processed based on a function of the information processing means 23. When the content of an order for making an index print is designated, an index picture data is produced (#26). Produced index picture data is held in a prescribed directory of the picture holding section 25.

While, when an order data for a photo print is transmitted from a client, data relating to the order may be immediately transmitted to the photo processing system 1, in this embodiment, the data relating to the order is held temporarily held in the server system 2. In the state, the process awaits for a download request from the photo processing system 1 (#27).

Simple description will be given here of a procedure of a case where an access is made from the photo processing system to the server system 2. In order for a photo shop to accept an on-line print order, a necessity arises for the photo shop to register a membership as in a case with an individual user. Since a procedure for the registration is almost similar to the case shown in FIG. 3, no description thereof will be given. If photo shops registers respective memberships, they are provided with web pages of individual exclusive use therefor. Shown on a Web page is an order status of a corresponding photo shop. That is, it is displayed in a list with order numbers that there have been requests for print orders, requests for print orders have been dealt with and others.

In a case where there remains a print order not yet dealt with, the details can be known by clicking on an order number or the like and data relating to the print order can be downloaded. According to a download request, the server system 2 transmits picture data and others to the photo processing system 1. The photo processing system 1, which has received the picture data, makes a photo print based on a known procedure for making a print.

In a panel at the bottom side of FIG. 4, shown is an example print in a case where titles are formed on an index print. In the panel, the titles are printed on the lower sides of respective corresponding thumb nail pictures. In such a way, an index print with a higher added value can be made. Furthermore, in comparison with a case where a personal computer display screen image shown in the top panel of FIG. 4 is printed as they are, no printing occurs of useless images other than pictures and titles. Note that in a case where titles are printed on the rear surface of a print, auxiliary data obtained from the server system 2 are stored at a time in the auxiliary data storage section 16 and then printing is performed with the rear surface printing machine 17.

<On-Line Album with Bulletin Board Function>

Figure 7:
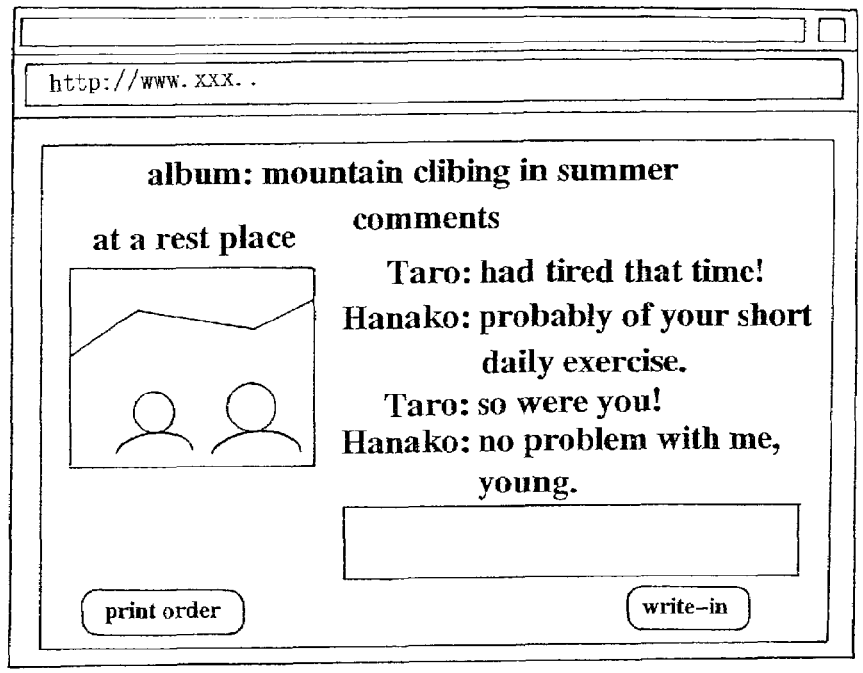
FIG. 7 is a representation showing an example display of an on-line album with a function of a bulletin board.

Then, description will be given of an on-line album with a function of an electronic bulletin board (BBS). FIG. 7 is a representation showing an example display of an on-line album. On the bulletin board, generally, an indefinite many number of users can be written. When writing is performed, a write button displayed on the screen image is clicked on. Functions of the bulletin board are provided together with one picture as shown on the top side of FIG. 7. Furthermore, shown in the top left corner is a string of characters saying "at a rest place" as a title and a user as an owner of the album can input this title. Note that, there can be thought of various example modifications of on-line album with a bulletin board function other than the format shown in FIG. 7. For example, two or more pieces of pictures in display may be possible.

There is a write-in box provided in order to write onto the bulletin board, in which a comment is allowed to write therein. The comment is not limited to a person who pastes the picture, but various persons can write in, thereby enabling the album to be more pleasant. The comment written on the bulletin board (corresponding to auxiliary data) and/or the title can be printed together with the picture.

An example of a product is shown in the bottom side of FIG. 7. A picture is printed on the front surface of a photo print and on the rear surface, a title and comments on the bulletin are printed.

As described above, auxiliary data can be printed together with a picture pasted in a non-line album. Accordingly, a comment written in the album can be enjoyed by a viewer while viewing not a picture on a personal computer but a photo print. Furthermore, the contents written in an on-line album are effectively used in the form of a print. In addition, how to be fun with an on-line album can be told with the help of such a photo print to a person who is unfamiliar with an interesting aspect of the on-line album.

On the other hand, from the view point of a photo shop, since a photo print of an absolutely new type can be provided, an added value of a photo print is enhanced, which would result in increase in sales.

(Other Embodiment of the Invention)

(1) The server system 2 maybe constructed of plural servers functionally distributed. For example, a construction may be adopted in which functions are distributed to Web servers providing Web pages, file servers holding pictures, data base servers registering membership information and others, which alleviates individual servers loads.

(2) While in this embodiment, a sever system performs production of index picture data as print picture confirmation information, the index picture data may be produced in the photo processing system.

(3) The construction of communication means when communications are performed is not limited to a specific one, but a network, wired or wireless, may be used. A closed network, which is not an open network like the internet, may be used.

(4) As a construction of the photo processing system is not limited to a specific one. For example, a construction may be adopted in which a printer processor with functions to perform exposure and printing and an image processor obtaining picture data from various kinds of record media are separate devices; and the two processors are connected by a communication cable or alternatively, the above printer processor and the image processor may be integrated into one piece.

(5) While in this embodiment, description has been given of an example in which auxiliary data is printed on the rear surface of a print except a case where titles are formed on an index print, the auxiliary data may be formed on the front surface of a print. In this case, if auxiliary data and picture data are subjected to image synthesis processing, both data can be printed together using an exposure engine. The image synthesis may be performed either in the server system or in the photo processing system.

(6) Auxiliary data is not limited to text data. Auxiliary data may be a data described in HTLM format or the like. An illustration (image data) may be used as auxiliary data.

What is claimed is:

1. A print system for printing an on-line album picture comprising:
    a server system for storing the on-line album accessible by a client's computer and one or more computers other than the client's computer through a network, wherein said on-line album is composed of picture data and non-picture auxiliary data relating to said picture data inputted through a display image of said on-line album, wherein said picture data is inputtable from the client's computer, and said non-picture data is inputtable from the client's computer and the one or more computers other than the client's computers, said server system capable of transmitting said picture data together with said non-picture auxiliary data used in the on-line album, said non-picture auxiliary data being text format data; and
    a photo processing system capable of receiving and downloading said picture data and said non-picture auxiliary data as separate data at the same time to make a photo print on which said picture data and auxiliary data are both indicated, wherein said server system provides an order status from said photo processing system only if a photo shop has a registered membership associated with said server system.

2. The print system of claim 1, wherein said auxiliary data is comment data on said picture data.

3. The print system of claim 1, wherein the photo processing system is configured to download the picture data and the auxiliary data in separate data storage sections.

4. The print system of claim 1 wherein the text format data is described in HTML format.

5. The print system of claim 1, wherein said photo processing system is provided an order status from said server system in case said photo processing system registers respective membership of said on-line album.

6. The point system of claim 1, wherein said on-line album has a bulletin board where the non-picture auxiliary data relating to the picture data is inputtable from the client's computer and the one or more computers other than the client's computer.

7. A server system for storing an on-line album accessible by a client's computer and one or more computers ether than the client's computer through a network to enable making a photo print through said on-line album comprising:
    album providing means for providing said on-line album through said network to the client's computer and the one or more computers other than the client's computer, wherein said on-line album is composed of picture data and non-picture auxiliary data relating to said picture data inputted through a display image of said on-line album, wherein said picture data is inputtable from the client's computer, and said non-picture data is inputtable from the client's computer and the one or more computers other than the client's computer; and
    information processing means for processing said picture data and said auxiliary data thereof uploaded from said client's computer to enable both processed data to be provided through said on-line album, said information processing means including a data extracting section capable of extracting the picture data and the auxiliary data as separate data, wherein said auxiliary data is text format data, wherein reception of an order for a print of a picture pasted in said on-line album is enabled through said album providing means; and
    said information processing means processes said picture data and said auxiliary data as separate data thereof relating to said print order so as to be transmittable to a photo processing system based on a download request from said photo processing system, wherein said server system provides an order status from said photo processing system only if the photo shop has a registered membership associated with said server system.

8. The server system of claim 7, wherein said auxiliary data is comment data on said picture data.

9. The server system of claim 7, wherein said auxiliary data is title information on said picture.

10. The server system of claim 7, wherein said album providing means is constructed so as to provide a bulletin board on which a comment on said picture can be written to process said comment written on said bulletin board as said auxiliary data.

11. The server system of claim 7, wherein said information processing means produces index picture data based on picture data and auxiliary data thereof.

12. The server system of claim 7, wherein the text format data is described in HTML format.

13. A photo processing system for downloading data from an on-line album provided on a network to thereby make a photo print, comprising:

communication means for receiving and for downloading picture data and non-picture auxiliary data as separate data at the same time, which are provided by a server system, wherein said auxiliary data is text format data, wherein said non-picture auxiliary data of a picture together with said picture data can be provided from the client side to said on-line album; and said photo processing system further comprising a print making means making a photo print on which picture and auxiliary information from the on-line album are both formed, based on said picture data and said auxiliary data downloaded, wherein said server system provides an order status from said photo processing system only if said photo processing system registers respective membership of said on-line album.

14. The photo processing system of claim 13, wherein said print making means forms a picture on a front surface of a photosensitive material and auxiliary information on a rear surface thereof.

15. The photo processing system of claim 13, wherein said communication means is configured to download the picture data and the auxiliary data in separate data storage sections.

16. The photo processing system of claim 15, wherein said communication means further comprise an exposure engine connected to the data storage section of the picture data for printing a picture on a front surface of a photosensitive material based on the picture date, and a rear surface printing machine connected to the data storage section of the auxiliary data for printing information on a rear surface of the photosensitive material based on the auxiliary data.

17. The photo processing system of claim 13, wherein the text format data is described in HTML format.

* * * * *